J. W. ILEY.
WIND WHEEL.
APPLICATION FILED MAR. 29, 1915.
1,180,500.
Patented Apr. 25, 1916.
2 SHEETS—SHEET 1.
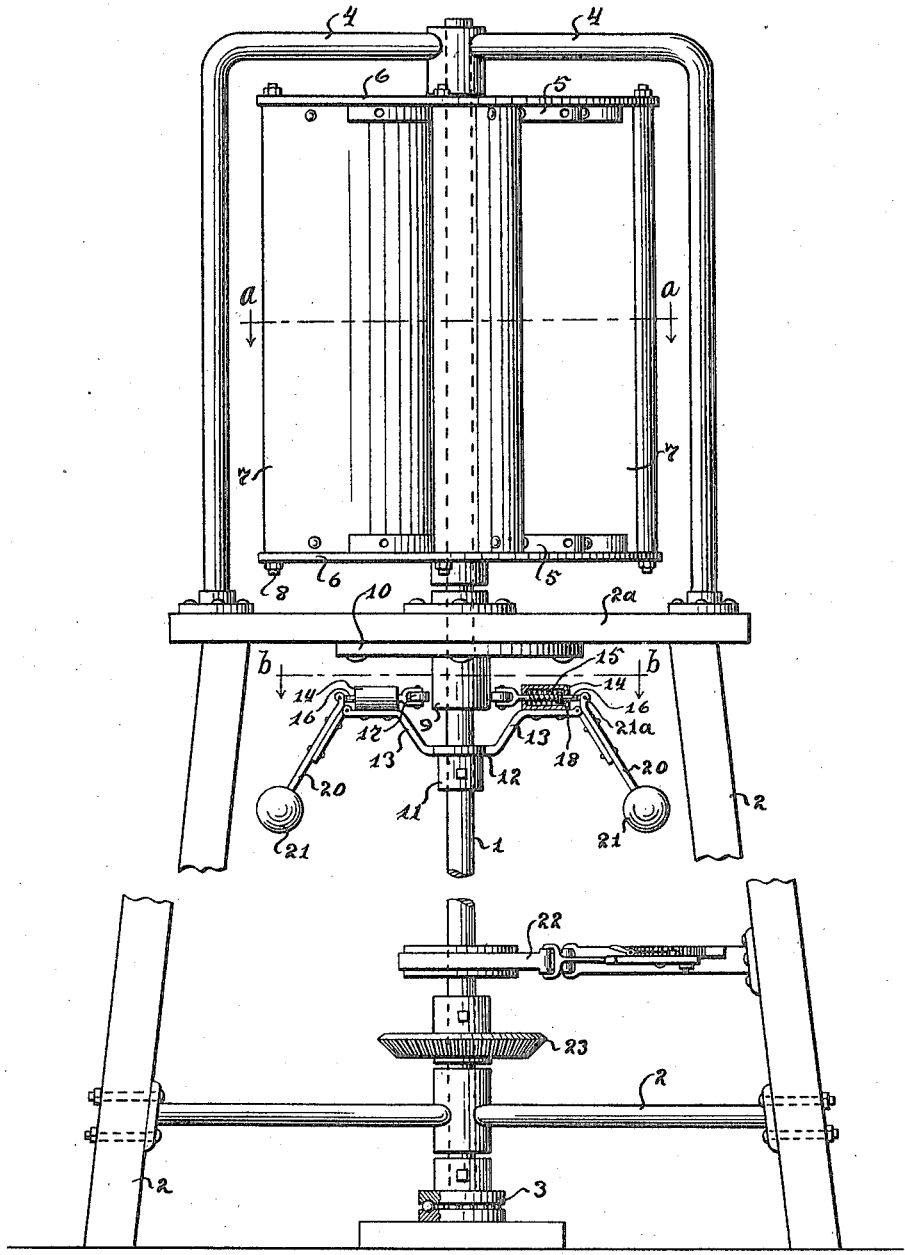
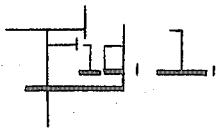
WITNESS
W. B. Champlin, Jr.
INVENTOR
J. W. Iley
BY
John M. Spellman
ATTORNEY

J. W. ILEY.
WIND WHEEL.
APPLICATION FILED MAR. 29, 1915.

1,180,500.

Patented Apr. 25, 1916.
2 SHEETS—SHEET 2.

WITNESS
W. B. Champlin Jr.

INVENTOR
J. W. Iley
BY
John M. Spellman
ATTORNEY

UNITED STATES PATENT OFFICE.

JOHN W. ILEY, OF FARMERS BRANCH, TEXAS.

WIND-WHEEL.

1,180,500.  Specification of Letters Patent.  Patented Apr. 25, 1916.

Application filed March 29, 1915.   Serial No. 17,881.

*To all whom it may concern:*

Be it known that I, JOHN W. ILEY, a citizen of the United States, residing at Farmers Branch, in the county of Dallas and State of Texas, have invented certain new and useful Improvements in Wind-Wheels, of which the following is a specification.

My invention has relation to an improvement in wind wheels and in such connection it relates more particularly to the construction of a wind wheel wherein a vertically arranged shaft is adapted to be driven by the wheel secured directly to the shaft, the shaft being provided with means for directly driving the pump or other driven device.

Heretofore in wheels propelled by the wind and adapted to utilize wind power in the operation of pumps, driven devices and the like, the wheel was presented to the wind from one end of a horizontal shaft and the face of the wheel was in a plane parallel with the vertical driving shaft. This construction necessitates the use of more or less complicated gearing for connecting the wheel shaft with the driving shaft and it increases the number of parts of the structure which are subject to deterioration and disarrangement. Again in such construction a vane is necessary to control the operation of the wheel carrying means in the proper presentation of the wheel to the wind.

My present invention contemplates the provision of a wind wheel having wind collecting faces or pockets extending in vertical planes surrounding a vertical driving shaft as an axis, and said wheel is secured directly upon the said shaft and operates it directly without the intervention of gearing or power transmitting means.

The invention further contemplates the use of a governor traveling with the shaft and operating to limit the speed of revolution not only of the driving shaft but of the wheel which forms substantially an integral part of said shaft.

The nature and scope of my invention will be further understood from the following description taken in connection with the accompanying drawings forming part hereof, in which,—

Figure 2:
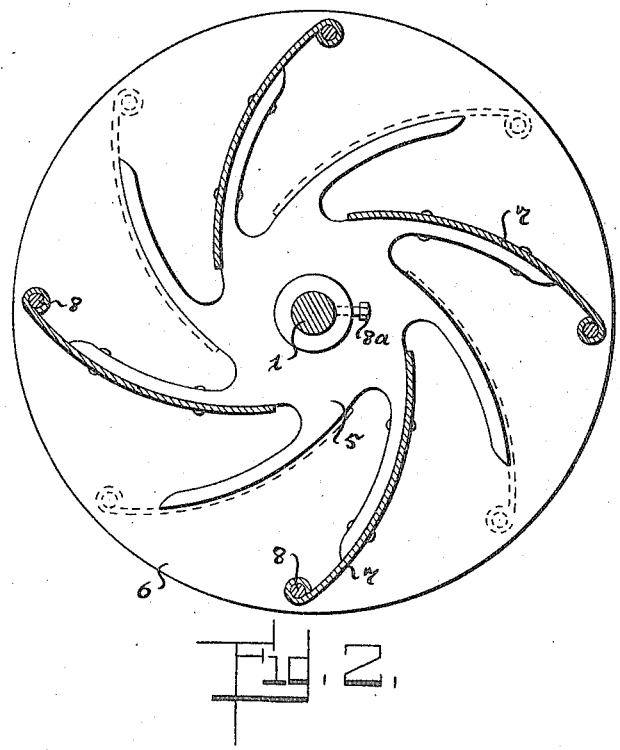
Figure 3:
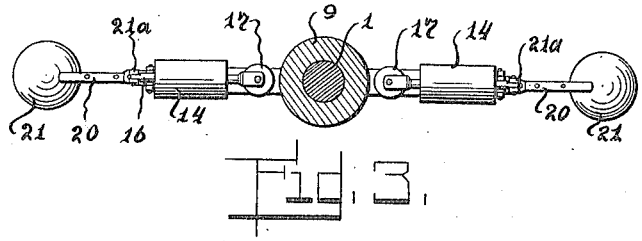

Figure 1, is a front elevational view of a wind mill embodying main features of my invention. Fig. 2, is a cross sectional view taken on the line *a, a,* of Fig. 1 and illustrating the construction and arrangement of the wind wheel, and Fig. 3, is a cross sectional view taken on line *b, b,* of Fig. 1 and illustrating the construction and arrangement of the governor.

Referring to the drawings, 1 represents the vertically arranged driving shaft of the structure and 2 represents the frame work serving to support said shaft 1 in its vertical position. The base of the shaft 1 preferably turns in a ball bearing 3. The frame work 2 supports an inverted U-shaped brace 4 serving to support the upper end of the shaft 1 and to stiffen the same. Upon that portion of shaft 1 which is inclosed by the brace 4 is secured the wind wheel comprising an upper and a lower spider or frame work 5, each preferably carrying a disk separated by the wheel blades or vanes 7, so that the structure has the shape of a fan wheel or blower with the curved blades 7 forming vertically disposed and outwardly diverging pockets projecting tangentially from an interior axially arranged chamber and closed at either end by the disks 6. Each blade 7 in series is maintained in proper relationship to the other blades and to the disks 6 by being riveted or otherwise removably secured at its upper edge to the upper spider 5 and at its lower edge to the lower spider 5 and the outer side of each blade 7 is reinforced by being coiled around a vertically disposed rod 8 connecting the two disks 6 together.

Each spider 5 is bolted or otherwise secured as at 8ª to the vertical shaft 1, and to permit of an increase or decrease of the number of wind pockets in the wheel all that is necessary is to either secure additional blades 7 to vacant arms of the spider 5 as indicated in dotted lines in Fig. 2 or else take out from the arms when so filled such a number of blades as are necessary. It will be understood that the number of pockets so formed will depend upon the average velocity of the wind.

To prevent, as in case of abnormally high winds, the wheel from traveling faster than is safe or desirable I make use of a governor operated by the shaft 1 and arranged to operate on said shaft in the following preferred manner. On the shaft 1 below the top of frame work 2 is loosely secured a sleeve 9 preferably formed of wood or fiber covered metal. The sleeve 9 is carried by a bracket or plate 10 secured to and depending from the top 2ª of frame work 2. Below the sleeve 9 and directly secured to shaft 1 is a collar 11 carrying a frame 12 the ends of which project in the form of two radially disposed arms 13 from said collar 11. On each arm 13 is supported a box 14 containing a spring 15, and traversing each box 14 is a pin 16 having outside the box 14ª roller 17 arranged as the arms 13 and boxes 14 revolve with shaft 1 to travel adjacent to or on and around the sleeve 9. The pins 16 each have a plate 18 arranged within the box 14, with the spring 15 coiled around the pin and extending between the plate 18 and the opposite end of box 14 so that the spring 15 normally tends to throw its pin outwardly to withdraw the roller 17 carried by said pin from sleeve 9. To the outer free end of each arm 13 is pivoted or hinged a governor arm 20, the balls or weights 21 of which arms 20 being adapted under centrifugal force to raise the arms 20 in their hinged or pivotal supports. Each governor arm 20 is pivotally secured as at 21ª to a pin 16 so that when the arms 20 are elevated the pins 16 are pushed in the boxes 14 against tension of spring 15 to force the rollers upon the sleeve 9, and when said governor arms 20 drop the pins 16 and rollers 17 are withdrawn under tension of said springs 15.

Near the bottom of the shaft 1 is arranged a brake mechanism 22 of any approved form whereby if emergency demands, the rotation of shaft 1 and of the wind wheel may be instantly checked.

The shaft 1 is provided with a gear 23 from which power may be transmitted to a pump, motor or the like not shown.

Having thus described the nature and objects of my invention what I claim as new and desire to secure by Letters Patent, is,—

1. In a wind mill, a wind wheel comprising an upper and a lower spider having curved radiating arms, a disk carried by each spider, a series of curved blades disposed vertically with respect to the disks and detachably united to the spiders, said blades projecting beyond the curved arms of the spiders and forming a series of vertically disposed pockets communicating at their interior with a centrally and vertically disposed chamber, and diverging outwardly toward the periphery of the wheel.

2. In a wind mill, a wind wheel comprising an upper and a lower spider having curved radiating arms, a disk carried by each spider and projecting beyond the periphery of each of said spiders, a series of curved blades disposed vertically with respect to the disks and detachably united to the spiders, a vertically disposed shaft traversing both spiders and both disks, said shaft secured directly to the spiders, and an inverted U-shaped brace spanning the wheel and forming a bearing and support for the upper end of said shaft.

3. In a wind mill, a wind wheel comprising an upper and a lower spider having curved radiating arms, a disk carried by each spider and projecting beyond the periphery of each of said spiders, a series of curved blades disposed vertically with respect to the disks and detachably united to the spiders, a vertically disposed shaft traversing both disks and both spiders, said shaft secured directly to the spiders, and an inverted U-shaped brace spanning the wheel and forming a bearing and support for the upper end of said shaft in combination with a governor revolving with said shaft below the lower disk of the wheel and arranged to automatically regulate the speed of said shaft.

In testimony whereof I have signed my name to this specification.

JOHN W. ILEY.